United States Patent [19]

Hosokawa

[11] Patent Number: 5,732,300
[45] Date of Patent: Mar. 24, 1998

[54] MOUNTING MECHANISM FOR FILM PRESSING ROLLER OF CAMERA

[75] Inventor: Tetsuo Hosokawa, Tokyo, Japan

[73] Assignee: Asahi Kogaku Kogyo Kabushiki Kaisha, Tokyo, Japan

[21] Appl. No.: 705,970

[22] Filed: Aug. 30, 1996

[30] Foreign Application Priority Data

Sep. 6, 1995 [JP] Japan .................. 7-229490

[51] Int. Cl.⁶ .................................................. G03B 17/02
[52] U.S. Cl. ........................................ 396/415; 396/536
[58] Field of Search ................................ 396/411, 415, 396/535, 536, 387

[56] References Cited

U.S. PATENT DOCUMENTS

| | | | |
|---|---|---|---|
| 3,377,936 | 4/1968 | Goshima et al. | 396/415 |
| 4,274,726 | 6/1981 | Yoneyama et al. | 396/415 |
| 4,451,011 | 5/1984 | Engelsmann et al. | 242/332.8 |
| 4,477,162 | 10/1984 | Matsumoto | 396/406 |
| 4,974,787 | 12/1990 | Arai et al. | 396/387 X |
| 5,040,010 | 8/1991 | Arai | 396/538 |

FOREIGN PATENT DOCUMENTS

| | | |
|---|---|---|
| 1087967 | 10/1967 | United Kingdom. |
| 2045449 | 10/1980 | United Kingdom. |
| 2206215 | 12/1988 | United Kingdom. |

*Primary Examiner*—Safet Metjahic
*Assistant Examiner*—J. K. Han
*Attorney, Agent, or Firm*—Greenblum & Bernstein, P.L.C.

[57] ABSTRACT

A mounting mechanism of a camera having a film take-up spool is provided for mounting a film pressing roller on a camera body. The mounting mechanism includes a back cover, a roller supporting arm, an elastic member and a pressing device. The back cover is rotatably supported by the camera body. One end of the roller supporting arm is rotatably mounted to the camera body, and another end of the roller supporting arm is provided with the film pressing roller. The elastic member is provided on the camera body and engages with the roller supporting arm to hold the film pressing roller at a predetermined position spaced from the film take-up spool when the back cover is opened. The pressing device is provided on the back cover for pressing the elastic member toward the film take-up spool when the back cover is closed, so that the roller supporting arm is biased toward the film take-up spool by the biasing force of the elastic member to thereby press the film pressing roller toward the film take-up spool.

23 Claims, 5 Drawing Sheets

MOUNTING MECHANISM FOR FILM PRESSING ROLLER OF CAMERA

BACKGROUND OF THE INVENTION

1. Field of the Invention

The present invention relates to a mounting mechanism for mounting a film pressing roller of a camera which is adapted to press a film against a film take-up spool when a back cover is closed.

2. Description of the Related Art

In conventional cameras having an automatic film loading mechanism, when a back cover of the camera is closed after a leading end or tongue of a roll of film, housed in a film cartridge, which has been loaded into a film cartridge chamber of the camera, has been pulled out from the film cartridge and positioned across a film take-up spool provided in a spool chamber of the camera, the film take-up spool automatically winds the leading end of the film. The automatic film loading mechanism is provided with a film pressing roller which presses the film against the film take-up spool when the back cover is closed, so that the film can be caught by the film take-up spool without fail.

The inventor of the present invention, together with two other inventors, has proposed in Japanese Patent Application No. 7-225127 (filed on Sep. 1, 1995) another camera structure in which the back cover (back lid) of a camera is provided on the camera body thereof such that the back cover is pivoted at a shaft which is supported on the camera body and located at a position in front of the center of the spool chamber of the camera for the purpose of making the camera body small and compact, specifically making the width of the camera body short.

FIGS. 7 through 9 show the part of a camera having such a structure as noted above. In FIGS. 7 through 9, numeral 1 designates a back cover which can be opened and closed, numeral 2 designates a camera body, numeral 3 designates a spool chamber, numeral 4 designates a film take-up spool provided in the spool chamber 3, numeral 5 designates an aperture frame, numeral 6 designates a sprocket, F designates a film, and C designates the center of the spool chamber 3, which coincides with the center of rotation of the film take-up spool 4.

The back cover 1 is pivoted at a shaft 9 supported on the camera body 2, and the shaft 9 is located at a position in front of the center C of the spool chamber 3 as shown in FIGS. 7 through 9. A film pressing roller 7 as the aforementioned conventional film pressing roller is provided on the back cover 1 through a leaf spring 8 secured to an inner surface of the back cover 1.

However, if the camera body 2 is constructed as shown in FIGS. 7 through 9, i.e., if an end 2a of a side wall that defines the spool chamber 3 of the camera body 2 is located in front of the aperture frame 5 (on an object side), above the aperture frame 5 as viewed in FIGS. 7 through 9, the leading end of the film F may get caught between the side wall end 2a and the leaf spring 8 when the back cover 1 is being closed (FIG. 9), thus resulting in a film loading error.

SUMMARY OF THE INVENTION

It is an object of the present invention to provide a mounting mechanism for a film pressing roller in a camera having an automatic film loading mechanism in which a film is pressed by the film pressing roller against a film take-up spool when a back cover is closed, wherein a leading end of the film can be certainly wound onto the film take-up spool upon loading the film.

To achieve the object mentioned above, according to an aspect of the present invention, there is provided a mounting mechanism of a camera for mounting a film pressing roller on a camera body having a film take-up spool. The mounting mechanism includes a back cover, a roller supporting arm, an elastic member and a pressing device. The back cover is rotatably held by the camera body. One end of the roller supporting arm is rotatably held by the camera body, and another end of the roller supporting arm is provided with the film pressing roller. The elastic member is provided on the camera body and engages with the roller supporting arm to hold the film pressing roller at a predetermined position apart from the film take-up spool when the back cover is opened. The pressing device is provided on the back cover for pressing the elastic member toward the film take-up spool when the back cover is closed, so that the roller supporting arm is biased toward the film take-up spool by the biasing force of the elastic member to thereby press the film pressing roller toward the film take-up spool.

With this structure, due to the roller supporting arm rotatably held by the camera body, the leading end of the film is always properly caught by the film take-up spool upon loading the film.

Preferably, the elastic member consists of a leaf spring. One end of the leaf spring is supported by the camera body, and another end of the leaf spring engages with the roller supporting arm.

Preferably, the another end of the leaf spring slidably engages with the roller supporting arm.

According to another aspect of the present invention, there is provided a mounting mechanism of a camera for mounting a film pressing roller on a camera body. The camera is provided with an openable back cover. The leading end of a film is automatically wound by a film take-up spool when the back cover is closed. The mounting mechanism includes a roller supporting arm and a holding and biasing device. One end of the roller supporting arm is rotatably held by the camera body, and another end of the roller supporting arm is provided with the film pressing roller. The holding and biasing device holds the another end of the roller supporting arm at a position spaced from the film take-up spool by a predetermined distance when the back cover is opened. The holding and biasing device biases the another end of the roller supporting arm toward the film take-up spool when the back cover is closed.

According to yet another aspect of the present invention, there is provided a camera having a film pressing roller for pressing a film on a film take-up spool when a pivoted back cover of the camera is closed. The camera includes a roller supporting arm and an elastic member. One end of the roller supporting arm is rotatably held on a camera body, and a free end of the roller supporting arm supports the film pressing roller. The elastic member is fixed on the camera body and engages with and holds the roller supporting arm at a predetermined position when the back cover is opened. The elastic member is pressed toward the film take-up spool by the back cover when the back cover is closed, so that the film pressing roller presses the film against the film take-up spool due to the biasing force of the elastic member when the back cover is closed.

BRIEF DESCRIPTION OF THE DRAWINGS

The present invention will be described below in detail with reference to the accompanying drawings in which similar elements are indicated by similar reference numerals, and wherein.

DESCRIPTION OF THE PREFERRED EMBODIMENT

Figure 1:
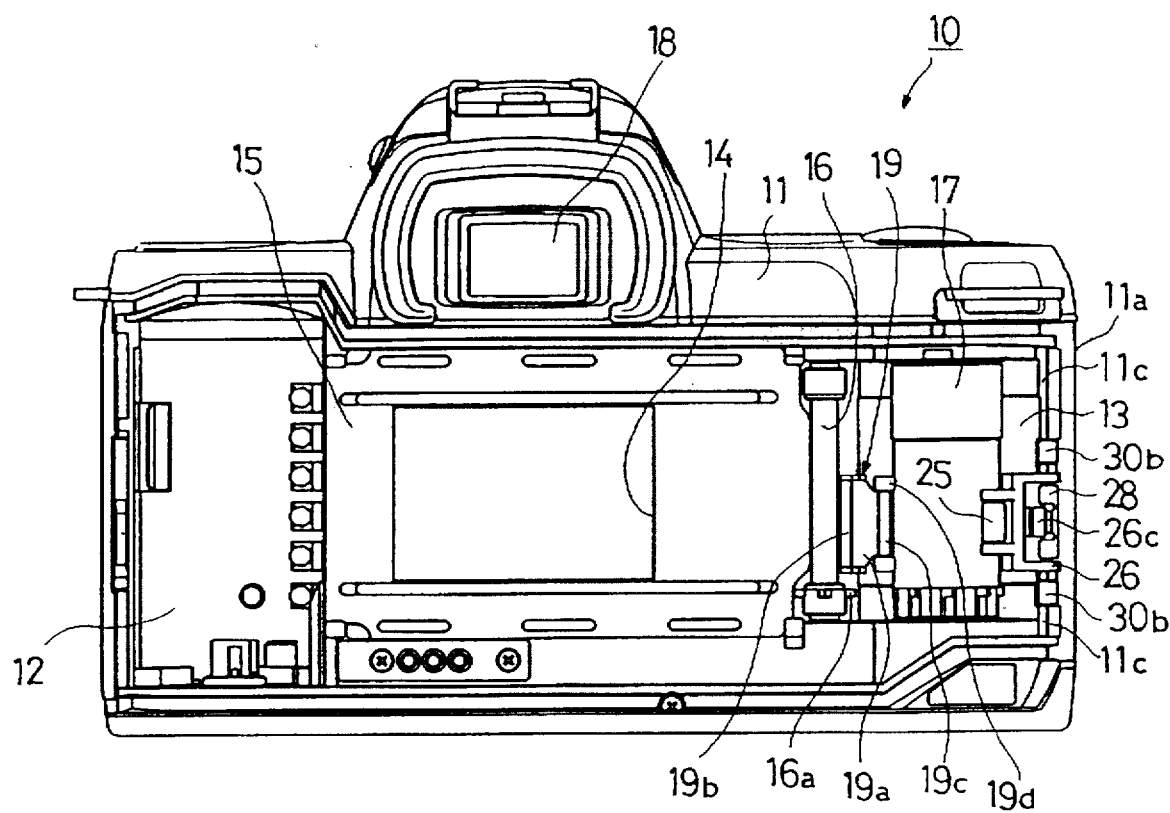
FIG. 1 is a rear view of a camera of a preferred embodiment.
Figure 4:
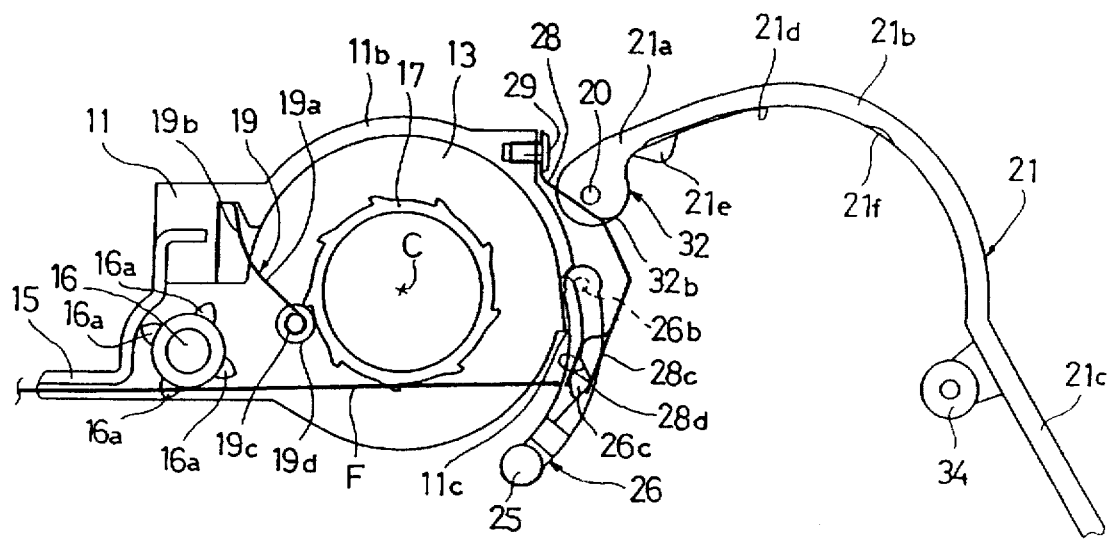
FIGS. 4, 5 and 6 are sectional views of components provided on the camera body shown in FIG. 1, in different states; and, FIGS. 7, 8 and 9 are sectional views of components of another camera corresponding to FIGS. 4, 5, and 6, respectively, having a structure in which the back cover is pivoted at a shaft located at a position in front of the center of a spool chamber.
Figure 5:
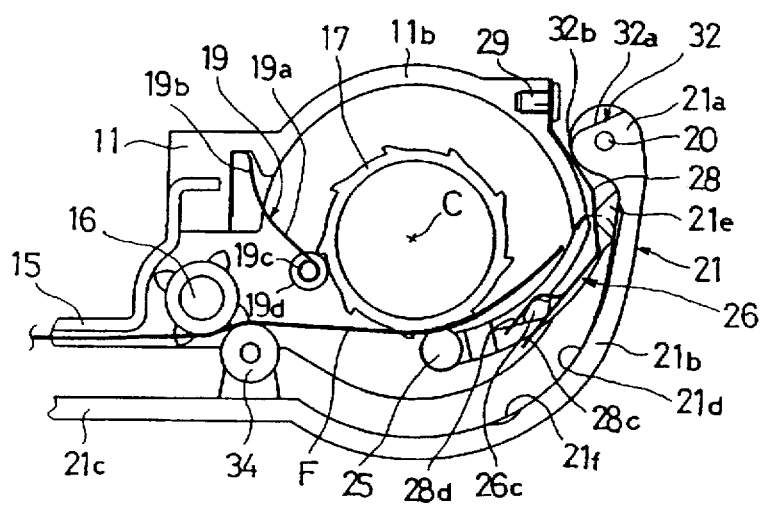
Figure 6:
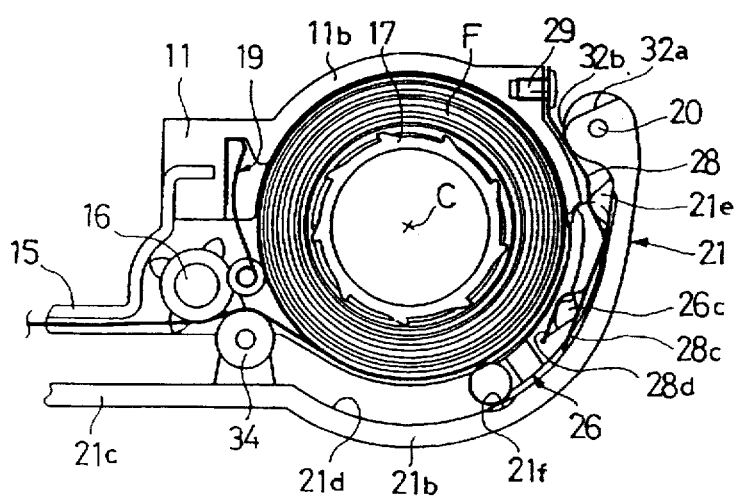
Figure 7:
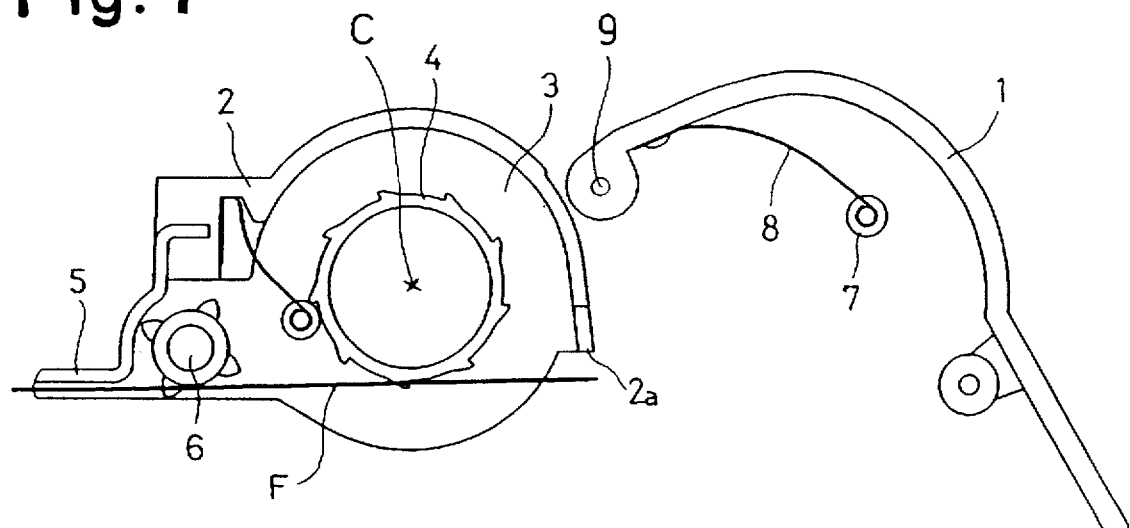
Figure 8:
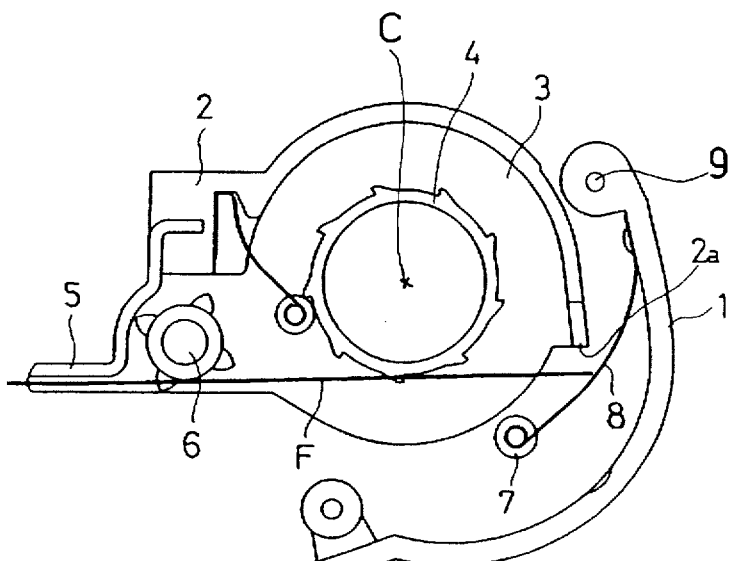
Figure 9:
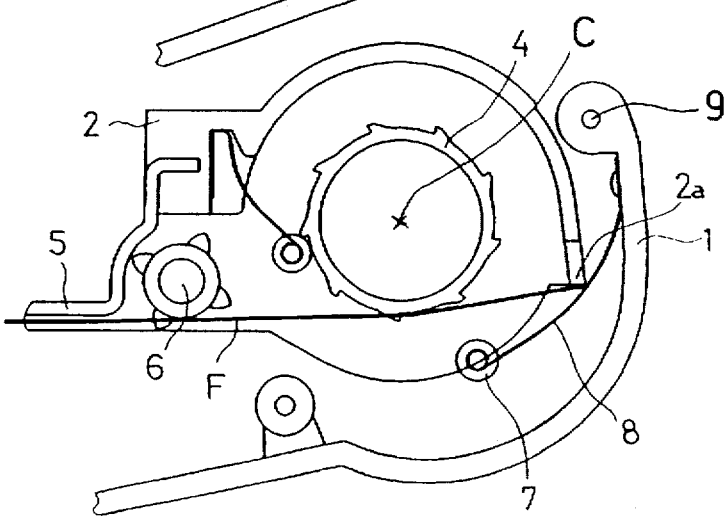

FIG. 1 shows a rear view of a camera body 11 of a camera 10 when a back cover 21 is opened. The back cover 21 is not illustrated in FIG. 1, but is illustrated in FIG. 4, 5 or 6.

The camera 10 has an automatic film loading mechanism per se known. According to the automatic film loading mechanism, when the back cover 21 is closed after a leading end or tongue of a film F, housed in a film cartridge (not show), which has already been loaded in a film cartridge chamber 12, has been pulled out from the film cartridge and positioned across a film take-up spool 17, the film take-up spool automatically winds the leading end of the film F. The film take-up spool 17 has a center of rotation "C", as shown in FIG. 4, 5 or 6.

The camera body 11 of the camera 10 is provided with the aforementioned film cartridge chamber 12, a spool chamber 13, and an aperture frame 15. The aperture frame 15 defines a rectangular-shaped photographing aperture 14 between the film cartridge chamber 12 and the spool chamber 13. The photographing aperture 14 defines the limits of each frame of the film F exposed during an exposure operation.

A sprocket 16 is provided between the aperture frame 15 and the spool chamber 13. The spool chamber 13 is provided therein with the film take-up spool 17. The film take-up spool 17 is rotated by a drive motor (not shown). An ocular portion 18 of a view finder is provided above the photographing aperture 14.

A film guide 19 is provided between the film take-up spool 17 and the sprocket 16. The film guide 19 includes a leaf spring 19a and a roller 19d. The leaf spring 19a is secured at one end 19b thereof to the camera body 11. The roller 19d is rotatably supported by the other end (free end) 19c of the leaf spring 19a. With this structure, due to the biasing force (spring force) of the leaf spring 19a, the roller 19d can be pressed against the film F such that the film F is wound about the film take-up spool 17.

The back cover 21 of the camera 10 opens and closes the inner space of the camera body 11 which contains the film cartridge chamber 12, the spool chamber 13, etc. One end 21a of the back cover 21 is pivoted at a pivotal shaft 20. The upper and lower ends of the pivotal shaft 20 are supported by a right side wall 11a (as viewed in FIG. 1) of the camera body 11.

The back cover 21 is provided with a curved portion 21b that partially surrounds the spool chamber 13 when the back cover 21 is closed. The shape of the curved portion 21b defines a substantially cylindrical space in the camera body 11, when the back cover 21 is closed. The back cover 21 is further provided with a flat portion 21c that covers the aperture frame 15. The flat portion 21c extends linearly along the aperture frame 15.

A curved roller supporting arm 26 is provided in the vicinity of an end 11c of a curved side wall 11b which is interally formed with the camera body 11 to define the spool chamber 13. The curvature of the roller supporting arm 26 is substantially parallel to the curvature of the film take-up spool 17 and corresponds to the shape of the inner surface of the curved portion 21b of the back cover 21.

Figure 2:
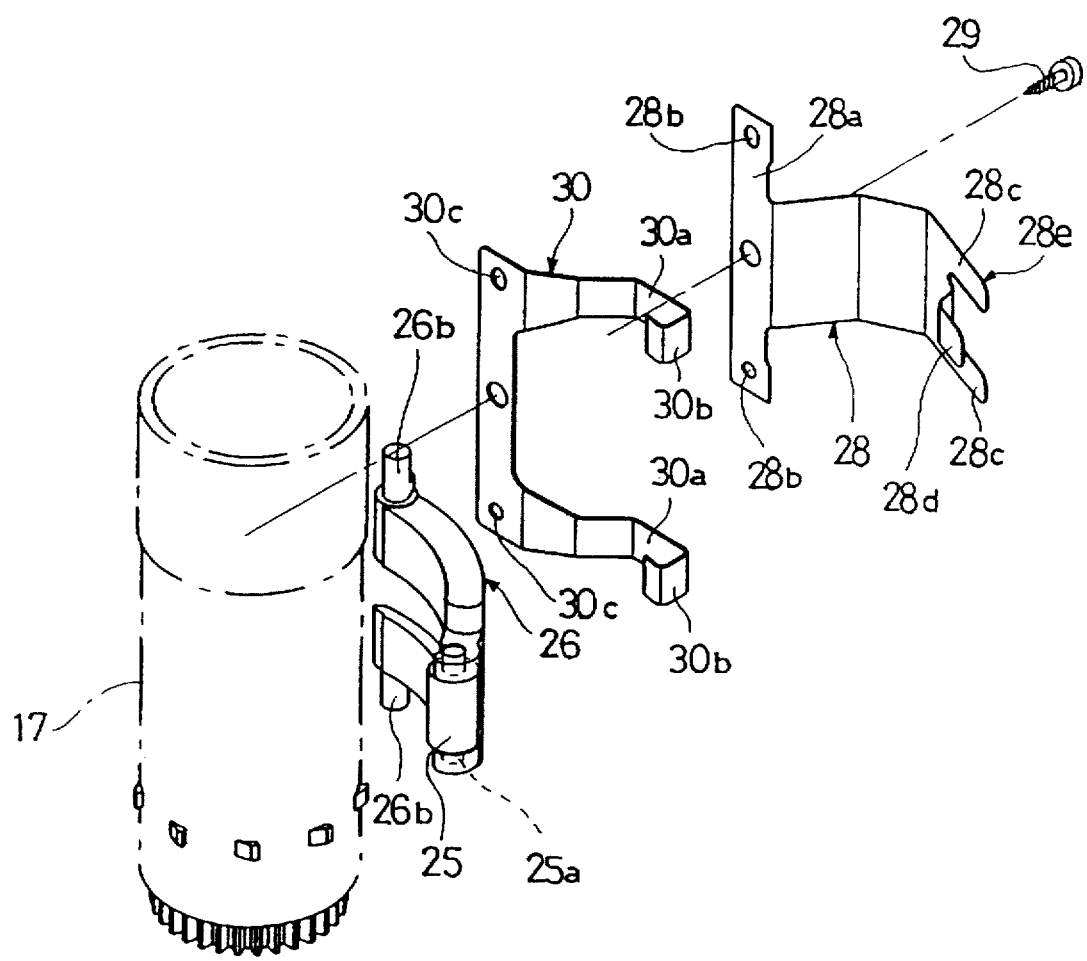
FIG. 2 is an exploded perspective view of a roller supporting arm, an abutment plate, and a leaf spring, in a mounting mechanism provided in a camera body of the camera shown in FIG. 1.
Figure 3:
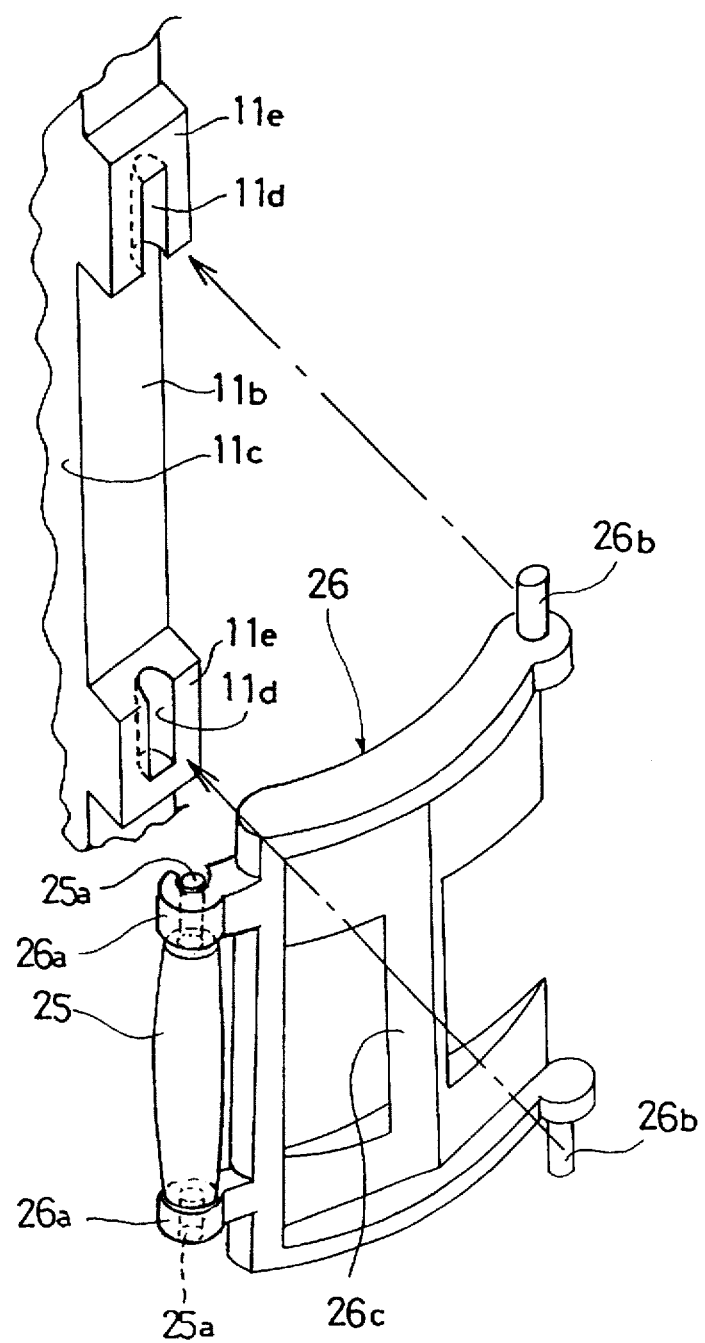
FIG. 3 is an enlarged perspective view of the roller supporting arm which supports a film pressing roller shown in FIG. 2.

On one end (free end) of the roller supporting arm 26 a film pressing roller 25 is provided. The film pressing roller 25 is provided with a shaft 25a integral therewith, as shown in FIG. 2. The shaft 25a is rotatably fitted in bearing portions 26a formed at one end of the roller supporting arm 26, as shown in FIG. 3. On the other end of the roller supporting arm 26, a pair of coaxial shafts 26b are provided. The pair of coaxial shafts 26b extend parallel to the shaft 25a. The shafts 26b are rotatably fitted in respective bearing grooves 11d (FIG. 3) formed in the vicinity of the end 11c of the side wall 11b of the camera body 11. As can be seen in FIG. 4, the shafts 26b and the center of rotation "C" of the film take-up spool 17 are located substantially at a common level in the forward and backward directions of the camera (upward and downward directions in FIGS. 4 through 6), namely the center of rotation "C" of the film take-up spool and the shafts 26b are substantially aligned in the same plane in a longitudinal direction of the camera 10. The portion of the roller supporting arm 26 that is located between the film pressing roller 25 and the shafts 26b is provided with an engaging post 26c. As can be seen in FIG. 3, the engaging post 26c extends parallel to the axes of the shafts 25a and 26b. The engaging post 26c can be slidably engaged by the free end of a leaf spring (elastic member) 28.

As shown in FIG. 2, a keeping plate 30 is secured to the side wall 11b of the camera body 11 through a screw 29. The keeping plate 30 is made of a thin metal plate. The keeping plate 30 is provided with a pair of parallel arm portions 30a. The arm portions 30a abut against abutment surfaces 11e formed above the bearing grooves 11d, in which the shafts 26b are fitted. With this structure the shafts 26b are prevented from being disengaged from the corresponding bearing grooves 11d. With this arrangement, the roller supporting arm 26 is rotatably attached to the camera body 11 through the shafts 26b. The arm portions 30a of the keeping plate 30 are each provided with a generally U-shaped (hook shape) front end 30b which can be engaged by the end 11c of the side wall 11b (FIG. 1).

The aforementioned leaf spring 28 is secured to the side wall 11b of the camera body 11 to bias the roller supporting arm 26 toward the film take-up spool 17. In a free state (as shown in FIG. 4) in which the back cover 21 is fully opened, the leaf spring 28 has no biasing force, so that the free end of the roller supporting arm 26 is spaced from the film take-up spool 17 by a predetermined distance. A secured end 28a of the leaf spring 28 is fastened onto the side wall 11b together with the keeping plate 30 by the common screw 29. The keeping plate 30 and the leaf spring 28 are provided with holes 30c and 28b in which positioning projections (not shown) formed on the side wall 11b of the camera body 11 are fitted, respectively.

The leaf spring 28 has an engaging fork portion (three-pronged portion) 28e at a free end thereof. The engaging fork portion 28e includes two side prongs 28c that lie in a same plane, and a center prong 28d. The center prong 28d is provided between the two side prongs 28c. The center prong 28d is bent so as to be closer to the film take-up spool 17 than the above-mentioned plane in which the two side prongs 28c lie.

The engaging fork portion 28 engages with the engaging post 26c of the roller supporting arm 26. Namely, the engaging post 26c is held between the two side prongs 28c and the center prong 28d, so that when the roller supporting arm 26 rotates, the engaging post 26c slides between the two side prongs 28c and the center prong 28d.

The back cover 21, which is pivoted at the shaft 20, is provided on its one side 21a with a cam portion 32 which extends there alone. The cam portion 32 includes a first cam surface 32a and a second cam surface 32b. The first cam surface 32a does not press the leaf spring 28 when the back cover 21 is fully opened. The second cam surface 32b presses the leaf spring 28 toward the film take-up spool 17 when the back cover 21 is closed. The back cover 21 is also provided on an inner surface 21d thereof with a pressing projection 21e located in the vicinity of the side 21a of the back cover 21. The pressing projection 21e presses the leaf spring 28, together with the second cam surface 32b when the back cover 21 is closed, toward the film take-up spool 17. The cam portion 32 and the pressing projection 21e constitute a pressing means. A mounting mechanism of the camera 10 for the film pressing roller 25 consists of the pressing means, the roller supporting arm 26, the leaf spring 28, etc.

The back cover 21 is provided on the inner surface 21d thereof with a recess 21f. The recess 21f partly receives therein the film pressing roller 25 when the back cover 21 is closed. If the amount of the film F wound about the film take-up spool 17 is small, as shown in FIG. 5, the film pressing roller 25 does not enter the recess 21f. If the amount of the film F wound about the film take-up spool 17 is large, a part of the film pressing roller 25 that is opposed to the back cover 21 can be received in the recess 21f. The recess 21f can prevent or restrict the curved portion 21b of the back cover 21 from being pushed outward in the backward direction of the camera body 11. Moreover, the back cover 21 is provided on the inner surface 21d with a roller 34. The roller 34 comes into contact with the film F to slightly press the film F toward the sprocket 16 when the back cover 21 is closed, so that the projections 16a of the sprocket 16 can be engaged in the perforations (not shown) of the film F.

A film loading operation in the camera 10 as constructed above is carried out as follows.

A new film cartridge is loaded in the film cartridge chamber 12, and a leading end of the film F is pulled out from the film cartridge so that the leading end of the film F is positioned on the film take-up spool 17 in the spool chamber 13 (FIG. 4). When the back cover 21 is closed, the second cam surface 32b presses the leaf spring 28 toward the film take-up spool 17, and the pressing projection 21e presses the leaf spring 28 toward the film take-up spool 17. Thereafter, the roller 34 presses the film F toward the sprocket 16 (FIG. 5). Namely, the pressing means, constituted by the cam portion 32 and the pressing projection 21e, moves and biases the roller supporting arm 26 and the film pressing roller 25 toward the film take-up spool 17 through the leaf spring 28, when the back cover 21 is closed. Consequently, the roller supporting arm 26 is rotated in the clockwise direction, as viewed in FIG. 4, by the movement of the leaf spring 28 caused by the second cam surface 32b and the pressing projection 21e, so that the film pressing roller 25 can be Dressed against the film F on the film take-up spool 17 by the biasing force of the leaf spring 28.

Thereafter, the film take-up spool 17 is rotated in the winding direction to wind the film F, (i.e., in the counter-clockwise direction as viewed in FIG. 5) by the automatic film loading mechanism (not shown). When the first frame of the film F is moved to the position corresponding to the position of the photographing aperture 14, the film winding operation is stopped, so that the camera 10 is ready for a photographing operation. Upon completion of the photographing operation, and when the back cover 21 is opened after all the film F has been rewound into the film cartridge, the biasing force of the leaf spring 28 by the cam portion 32 and the pressing projection 21e is released. Namely, the biasing force to press the roller supporting arm 26 and the film pressing roller 25 toward the film take-up spool 17 through the leaf spring 28 disappears. Consequently, the free end of the roller supporting arm 26 is spaced from the film take-up spool 17 by a predetermined distance.

In the camera 10, upon loading a film, since no leading end of the film F is drawn out beyond the roller supporting arm 26 to protrude from the camera body 11, as shown in FIG. 4, the leading end of the film F can be certainly wound about the film take-up spool 17.

Although the leaf spring 28 and the keeping plate 30 are made of separate pieces in the illustrated embodiment, these elements may be made of a single piece. Also, the leaf spring 28 can be replaced by another biasing means, such as a snap spring, etc., having the same function as the leaf spring.

As can be understood from the above discussion, according to the mounting mechanism for the film pressing roller 25 of the above preferred embodiment, since the mounting mechanism includes the roller supporting arm 26 whose one end is pivoted at the shafts 26b held by one end of the camera body 11 adjacent to the spool chamber 13 and which is provided on the other end with the film pressing roller 25, the leading end of the film F can be accurately engaged by and wound on the film take-up spool 17.

What is claimed is:

1. A mounting mechanism of a camera for mounting a film pressing roller on a camera body having a film take-up spool, said mounting mechanism comprising:

a spool chamber in which said film take-up spool is provided:

a back cover, an end of said back cover being pivoted about a first shaft proximate to said spool chamber;

a curved wall provided on said camera body forming said spool chamber, a portion of said curved wall adjacent to said end of said back cover positioned forwardly of a rearmost portion of said film take-up spool, in a direction transverse to a plane of an aperture frame of said camera;

a roller supporting arm, one end of said roller supporting arm being pivoted about a second shaft supported by said portion of said curved wall, and another end of said roller supporting arm being provided with said film pressing roller so that said film pressing roller contacts said film take-up spool when said roller supporting arm rotates toward said film take-up spool;

an elastic member provided on said camera body, said elastic member engaging said roller supporting arm to hold said film pressing roller at a predetermined position spaced from said film take-up spool when said back cover is opened; and pressing means, provided on said back cover, for pressing said elastic member toward said film take-up spool when said back cover is closed so that said roller supporting arm is biased toward said film take-up spool by a biasing force of said elastic member to press said film pressing roller toward said film take-up spool.

2. The mounting mechanism according to claim 1, wherein said elastic member comprises a leaf spring, one end of said leaf spring being supported by said camera body and another end of said leaf spring engaging with said roller supporting arm.

3. The mounting mechanism according to claim 2, wherein said another end of said leaf spring slidably engages with said roller supporting arm.

4. The mounting mechanism according to claim 3, wherein said roller supporting arm comprises an engaging post integrally formed integral with said roller supporting arm, said another end of said leaf spring slidably engaging with said engaging post.

5. The mounting mechanism according to claim 4, wherein said another end of said leaf spring comprises a three-pronged portion slidably holding said engaging post.

6. The mounting mechanism according to claim 1, wherein said back cover is rotatably supported by said camera body such that one end of said back cover is pivoted about a pivotal shaft of said camera body.

7. The mounting mechanism according to claim 6, wherein said one end of said roller supporting arm is rotatably supported by said camera body such that said one end of said roller supporting arm is pivoted about a shaft extending parallel to said pivotal shaft about which said back cover is pivoted.

8. The mounting mechanism according to claim 7, wherein said shaft, about which said one end of said roller supporting arm is pivoted, is aligned in substantially a same plane as a center of rotation of said film take-up spool in a longitudinal direction of said camera.

9. The mounting mechanism according to claim 6, wherein said pressing means comprises a cam portion, formed along said one end of said back cover, and a pressing projection, provided on an inner surface of said back cover in a vicinity of said one end of said back cover.

10. The mounting mechanism according to claim 1, wherein said one end of said roller supporting arm and a center of rotation of said film take-up spool are aligned in a plane substantially parallel to a longitudinal direction of said camera.

11. The mounting mechanism according to claim 1, wherein a curvature of said roller supporting arm is substantially parallel to a curvature of said film take-up spool.

12. The mounting mechanism according to claim 11, wherein a portion of said back cover, located adjacent to said roller supporting arm when said back cover is closed, has a curved shape that substantially corresponds to a curved shape of said roller supporting arm.

13. The mounting mechanism according to claim 12, wherein an inner surface of said curved portion of said back cover is provided with a recess which receives a part of said film pressing roller when said back cover is closed.

14. The mounting mechanism according to claim 1, wherein said roller supporting arm extends from said end of said curved wall rearwardly of said camera body when said back cover is opened.

15. The mounting mechanism according to claim 1, said pressing means comprising a pressing member formed on said back cover, wherein when said back cover is closed, said pressing member comes into contact with said elastic member to bias said roller support arm toward said film take-up spool.

16. A mounting mechanism of a camera for mounting a film pressing roller on a camera body, said camera being provided with an openable and closeable back cover, a leading end of a film being automatically wound by a film take-up spool when said back cover is closed, said mounting mechanism comprising:

a spool chamber in which said film take-up spool is provided;

a curved wall provided on said camera body forming said spool chamber;

a roller supporting arm, one end of said roller supporting arm being pivoted about a shaft supported by said curved wall, and another end of said roller supporting arm being provided with said film pressing roller so that said film pressing roller contacts said film take-up spool when said roller supporting arm rotates toward said film take-up spool; and means for holding said another end of said roller supporting arm at a position spaced from said film take-up spool by a predetermined distance when said back cover is opened, and for biasing said another end of said roller supporting arm toward said film take-up spool when said back cover is closed.

17. The mounting mechanism according to claim 16, said biasing means comprising a pressing member formed on said back cover, and a leaf spring, wherein when said back cover is closed, said pressing member comes into contact with said leaf spring to bias said roller support arm toward said film take-up spool.

18. A camera having a film pressing roller for pressing a film on a film take-up spool when a pivoted back cover of said camera is in closed position, said camera comprising:

a roller supporting arm, one end of said roller supporting arm being rotatably supported on a camera body, and another end of said roller supporting arm being provided with said film pressing roller so that said film pressing roller contacts said film take-up spool when said roller supporting arm rotates toward said film take-up spool; and an elastic member fixed on said camera body, said elastic member engaging and holding said roller supporting arm at a predetermined position when said back cover is opened, wherein said elastic member is pressed toward said film take-up spool by said back cover when said back cover is closed, so that said film pressing roller presses said film against said film take-up spool due to a biasing force of said elastic member when said back cover is closed.

19. The mounting mechanism according to claim 18, further comprising a pressing member formed on said back cover, wherein when said back cover is closed, said pressing member comes into contact with said elastic member to bias said roller support arm toward said film take-up spool.

20. A mounting mechanism of a camera for mounting a film pressing roller on a camera body having a film take-up spool, said mounting mechanism comprising:

a spool chamber in which said film take-up spool is provided;

a back cover, an end of said back cover being pivoted about a first shaft proximate to said spool chamber;

a curved wall provided on said camera body forming said spool chamber;

a roller supporting arm, one end of said roller supporting arm being pivoted about a shaft supported by a portion of said curved wall adjacent to said end of said back cover, and another end of said roller supporting arm being provided with said film pressing roller so that said film pressing roller contacts said film take-up spool when said roller supporting arm rotates toward said film take-up spool;

an elastic member provided on said camera body, said elastic member engaging said roller supporting arm to hold said film pressing roller at a predetermined position spaced from said film take-up spool when said back cover is opened; and a pressing member, provided on said back cover, which presses said elastic member toward said roller supporting arm when said back cover is closed so that said roller supporting arm is biased toward said film take-up spool by a biasing force of said elastic member to press said film pressing roller toward said film take-up spool.

21. The mounting mechanism according to claim 20, wherein said elastic member comprises a leaf spring, an end of said leaf spring being supported by said camera body, and another end of said leaf spring engaging with said roller supporting arm.

22. The mounting mechanism according to claim 20, wherein said end of said roller supporting arm and a center of rotation of said film take-up spool are formed in a plane substantially parallel to a longitudinal direction of said camera.

23. The mounting mechanism according to claim 20, said pressing member comprising a protrusion provided on said back cover.

* * * * *